(12) United States Patent
Sforza

(10) Patent No.: US 8,406,275 B2
(45) Date of Patent: Mar. 26, 2013

(54) COMMUNICATIONS SYSTEM

(75) Inventor: Francois Sforza, Nice (FR)

(73) Assignee: Nanoscale Labs, La Tronche (FR)

( * ) Notice: Subject to any disclaimer, the term of this patent is extended or adjusted under 35 U.S.C. 154(b) by 410 days.

(21) Appl. No.: 12/720,139

(22) Filed: Mar. 9, 2010

(65) Prior Publication Data

US 2011/0064119 A1    Mar. 17, 2011

(30) Foreign Application Priority Data

Jul. 2, 2009 (EP) .................................. 09305641

(51) Int. Cl.
*H04B 1/00* (2006.01)
(52) U.S. Cl. ...................................................... 375/139
(58) Field of Classification Search .................. 375/139, 375/371, 298; 370/441, 307, 516
See application file for complete search history.

(56) References Cited

U.S. PATENT DOCUMENTS

| | | | |
|---|---|---|---|
| 5,550,549 A * | 8/1996 | Procter et al. | 342/47 |
| 6,252,882 B1 * | 6/2001 | Matsui | 370/441 |
| 6,549,562 B1 * | 4/2003 | Olaker et al. | 375/139 |
| 6,614,864 B1 * | 9/2003 | Raphaeli et al. | 375/371 |
| 6,940,893 B1 * | 9/2005 | Pinkney et al. | 375/139 |
| 2007/0126622 A1 * | 6/2007 | Nallapureddy et al. | 342/92 |
| 2008/0194215 A1 * | 8/2008 | Bolanos | 455/115.1 |
| 2008/0309543 A1 * | 12/2008 | Schaffner | 342/21 |

FOREIGN PATENT DOCUMENTS

EP    0 952 713    10/1999

OTHER PUBLICATIONS

European Search Report dated Nov. 25, 2009, from corresponding European application.

* cited by examiner

*Primary Examiner* — David C. Payne
*Assistant Examiner* — Wednel Cadeau
(74) *Attorney, Agent, or Firm* — Young & Thompson

(57) ABSTRACT

A communications system includes a modulator for generating a chirp signal aimed at spreading the frequency spectrum of an information signal over a specified spectral bandwidth of a communications channel. The chirp signal has initial and final instantaneous frequency. The chirp signal is controlled from an in-phase control signal and a quadrature-phase control signal to have, in a complex plane, constant amplitude and instantaneous phase. The instantaneous frequency is defined by the speed the instantaneous phase is changed in the complex plane by the in-phase and quadrature-phase control signals; the instantaneous frequency is linearly changed between initial and instantaneous frequencies over the whole duration of the chirp signal; the initial and final instantaneous phases of the chirp signal are identical. The communications system also described an adapted demodulator capable of working even in presence of a significant frequency and/or timing offset between the transmitting and receiving clocking systems.

20 Claims, 11 Drawing Sheets

COMMUNICATIONS SYSTEM

FIELD OF THE INVENTION

The present invention relates in general to the field of data communications and more specifically describes a system capable of communicating over longer distances in the same conditions of transmission power and energy dissipation than an existing system.

BACKGROUND OF THE INVENTION

In the field of wireless communications a greater emphasis has always been put since the origin on the development of products and communications infrastructures offering higher data rates so that it was possible, e.g., to add sophisticated data services after the initial objective of transmitting voice over a digital wireless network was achieved. Following this trend, GSM (global system for mobile communications), the predominant world wide wireless telephone system, has constantly evolved to offer higher data rates. Starting from a low data rate of 9.6 kilobits per second (Kbps), the first generation of digital mobile phone (2G) only allowed the exchange of text messages in the form of SMS (short message service). It has since evolved to a third generation of products (3G), through intermediate development steps (2.5 & 2.75), offering higher data rates so that a mobile phone can now receive videos and connect to the Internet over a public wireless network. Typically, network are organized in geographic cells of sizes as low as a few hundreds meters in urban areas up to several kilometers (Km) in less densely populated areas (maximum 35 km).

Another area in the field of telecommunications that has later received a great deal of attention is the wireless interconnection of the countless number of electronic devices now part of almost any human activity. This includes the above cellular phones that can now connect, e.g., to a wireless headset and, in general, to any sort of device properly equipped such as a PDA (portable digital assistant), a laptop computer, etc. To this end, the definition and publication of specifications by the Bluetooth Special Interest Group (SIG) since 1998 has allowed the development, licensing and implementation of standard devices capable of actually interconnecting with each other's. Typically, Bluetooth devices are relatively low-power devices capable of interconnecting within a few-meter range at a data rate of one megabit per second (Mbps).

There is however another area in the field of wireless communications that has failed receiving the attention it would have deserved yet. The two above mentioned areas have actually in common the objective of providing a relatively large data rate (in the order of 1 Mbps) for the applications they support. Hence, they are not only able to transmit voice but have also a significant bandwidth available for all sorts of data applications. At this point of view, GSM and Bluetooth only differ in their ability to communicate at different distances; typically, within a few kilometers for a cellular phone and a few meters for a Bluetooth device.

Among the plethora of electronic devices which need to communicate with each other's, or with a central communications point, many have however to run applications that only require a modest data rate to operate satisfactorily, well below that required to transmit voice in a digital form. Typically, a few Kbps is enough in many applications, e.g., in telemetry and remote monitoring systems. In this kind of applications there is only the need to communicate, often at scheduled intervals, the status of a sensor aimed at measuring a parameter, e.g., the temperature of a room in a building.

Even though Bluetooth SIG has launched a 'low energy' initiative to further reduce, as the name suggests, the power required to operate Bluetooth devices, a strong requirement for the above type of applications, it fails however addressing another requirement which is the ability to communicate over larger distances than the ten meters retained by the Bluetooth low energy specification. Indeed, many of the applications addressed by the invention, like telemetry and remote monitoring, need practically to communicate over longer distances without having recourse to a relay which necessarily needs to be located in close proximity of the Bluetooth device.

Hence, it is an object of the invention to disclose a system capable of communicating over distances significantly greater than the ten meters of the Bluetooth low energy specification while maintaining an equivalent operating point as far as energy dissipation of the device, power of the transmitter, and sensibility of the receiver are concerned.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention fulfills the above objectives by providing a communications system including a modulator for generating a chirp signal aimed at spreading the frequency spectrum of an information signal over a specified spectral bandwidth of a communications channel, the chirp signal having an initial instantaneous frequency and a different final instantaneous frequency. The modulator is characterized in that it comprises:

means for controlling the chirp signal from an in-phase control signal and a quadrature-phase control signal that define together, in a complex plane, over a whole duration of the chirp signal, a constant amplitude and an instantaneous phase for the chirp signal;

The system is further characterized in that it is arranged so that:

means for deriving an instantaneous frequency from the speed at which the instantaneous phase is changed in the complex plane by the in-phase control signal and the quadrature-phase control signal;

means for changing linearly the instantaneous frequency between the initial instantaneous frequency and the final instantaneous frequency;

means for having initial and final instantaneous phases of the chirp signal identical.

The invention further discloses a communications system including a demodulator for receiving a chirp signal having an initial instantaneous frequency and a different final instantaneous frequency, the demodulator is characterized in that it comprises:

means for discretely sampling the received chirp signal in the time domain in order to obtain a number of samples corresponding to a spreading factor that has been used to generate the chirp signal, further including means for evenly distributing samples over an whole chirp signal duration and means for processing the received chirp signal in a complex plane from an associated in-phase component and a quadrature phase component;

means for locally generating a conjugate chirp signal so that initial and final instantaneous phases of said conjugate chirp are identical and for interchanging values of the initial instantaneous frequency and of the final instantaneous frequency;

means for multiplying the received chirp signal by the locally generated conjugate chirp signal to obtain a product signal;

means for performing a discrete Fourier transform of the product signal to transpose it into the frequency domain, wherein there are as many output bins of the discrete Fourier transform as there are discrete samples of the received chirp signal;

means for selecting a single output bin of the discrete Fourier transform wherein a peak of energy is found;

means for analyzing contents of the single selected output bin to determine which chirp symbol has been received, further decoding and delivering whichever information signal one or more bits have been received.

Thus, the communications system according to the invention allows communicating over distances significantly greater while maintaining an equivalent operating point as far as energy dissipation of the device, power of the transmitter, sensibility of the receiver and spectral bandwidth occupied are concerned.

Besides, the invention allows driving the radio part of an existing communications system in order to increase communications distances allowed by the system at the expense of a reduced data rate. The existing communications system is, e.g. a Bluetooth device.

Optionally the modulator according to the invention comprises means arranged for performing any one of the following features:

a raw chirp symbol is defined by specifying a curve of instantaneous phase values over the whole duration of the chirp signal;

the information signal is embedded into the chirp signal by further specifying a plurality of curves of instantaneous phase values each defining a differently modulated chirp symbol;

an up chirp symbol and a down chirp symbol are defined by specifying that the final instantaneous frequency is, respectively, higher or lower than the initial instantaneous frequency;

a minimum of two different chirp symbols are defined;

a frame of transmitted chirps includes a preamble of one or more raw chirp symbols;

chirp symbols are separated by a dead time during which transmitter is kept silent;

a virtual instantaneous phase is attributed to the dead time to match the initial instantaneous phase of the chirp signal.

Optionally the demodulator according to the invention comprises means arranged for carrying out any one of the following features:

the position of the single selected output bin is indicative of which frequency and/or timing offset exists between the clocking systems of the transmitting and of the receiving communications systems;

the position of the single selected output bin is used to adjust the receiving clocking system on the transmitting clocking system;

the demodulator is analyzing the received chirp signal over a sliding window encompassing a plurality of raw chirp symbols, and wherein the window is slid of an entire chirp symbol duration at each analyzing step;

two or more raw chirp symbols of the preamble are added to improve the level of detection of the demodulator.

The invention also provides a communications system comprising a modulator according to any one of previous features and a demodulator according to any one of previous features.

In another aspect, the invention proposes a method for generating a chirp signal aimed at spreading the frequency spectrum of an information signal over a specified spectral bandwidth of a communications channel, the chirp signal having an initial instantaneous frequency and a different final instantaneous frequency. The method is characterized in that:

the chirp signal is controlled from an in-phase control signal and a quadrature-phase control signal to have, in a complex plane, a constant amplitude and an ever changing instantaneous phase;

the instantaneous frequency is defined by the speed at which the instantaneous phase is changed in the complex plane by the in-phase and quadrature-phase control signals;

the instantaneous frequency is linearly changed between the initial instantaneous frequency and the final instantaneous frequency over the whole duration of the chirp signal;

initial and final instantaneous phase of the chirp signal are identical.

In another aspect, the invention proposes a method for receiving a chirp signal having an initial instantaneous frequency and a different final instantaneous frequency. The method is characterized in that:

the received chirp signal is discretely sampled in the time domain to obtain a number of samples corresponding to a spreading factor used to generate the chirp signal, and wherein samples are evenly distributed over the whole chirp signal duration;

all demodulator signals are processed in a complex plane from an associated in-phase value and a quadrature phase value;

a conjugate chirp signal is locally generated wherein values of the initial instantaneous frequency and of the final instantaneous frequency are interchanged;

the received chirp signal is multiplied by the locally generated conjugate chirp signal to obtain a product signal;

a discrete Fourier transform is applied on the product signal to transpose it into the frequency domain;

a single output bin of the discrete Fourier transform with a peak of energy is selected;

the contents of the single selected output bin is analyzed to determine which chirp symbol has been received, further decoding and delivering which information signal one or more bits have been received.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
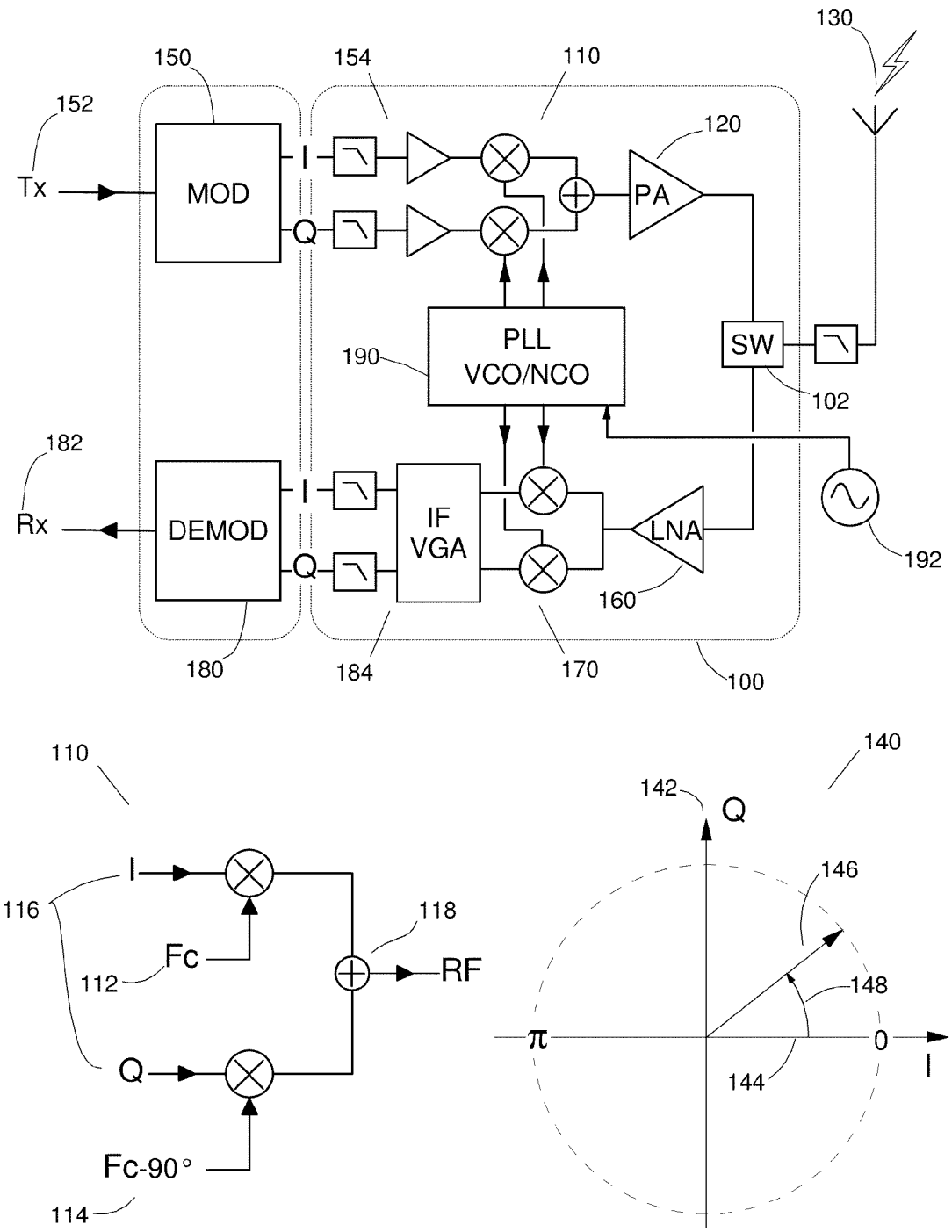
FIG. 1 shows the main components of a radio frequency (RF) transceiver from which the scheme of the invention can be carried out.

FIG. 1 shows the main components of a radio frequency (RF) transceiver from which the scheme of the invention can be carried out.

The invention assumes that a coherent modulation/demodulation scheme needs to be implemented. That is, a scheme where frequency and phase of a frequency carrier (Fc) can be controlled so that the transmitted signal, the carrier, can be precisely modulated in phase and frequency to broadcast information on the air. Signal that can be received and decoded by any remotely located receiver provided it implements the converse coherent demodulation scheme to retrieve the transported digital information from the modulated carrier. The above scheme assumes that amplitude of the transmitted signal is constant, i.e.: not modulated and does not carry any information.

Such a radio transceiver is used, e.g., by all Bluetooth communications devices discussed in the background section. Bluetooth is an open communications standard aimed at warranting the interoperability of all sorts of communications devices operating, in close proximity of each other, in the ISM (industrial, scientific and medical) frequency band between 2.4 and 2.5 GHz. Any communications device is free to operate in the ISM band anywhere in the world provided its level of emission is controlled, i.e., does not typically exceed 10 milliwatts (mW).

To implement the above coherent modulation/demodulation scheme an appropriate radio transceiver must implement an IQ modulation technique, a largely employed technique in which the baseband signal used to modulate the carrier is split in an in-phase signal (I) and a quadrature or 90° phase shift signal (Q). Hence, frequency and phase of the carrier Fc can be precisely controlled thus modulated by the low frequency baseband signal encoding the digital information to be broadcasted.

The principle of an IQ modulation 110 is shown in FIG. 1 where the baseband I and Q signals 116 are respectively up converted to the RF domain by the in-phase 112 and quadrature phase 114 carrier frequencies then combined 118 to be applied to a power amplifier 120 as a single signal which is broadcasted over the air through an antenna 130.

I and Q signals, in the baseband and RF domain, can be interpreted as shown in the diagram 140. They can be conveniently viewed, respectively, as the real part 144 and imaginary part 142 of a complex number having constant amplitude 146 and an instantaneous phase 148 in the complex plane 140. Instantaneous frequency of the signal is expressed by the speed at which the vector is rotated. I and Q are as well, respectively, cosine and sine values of the constant amplitude vector 146.

From the flow of data to be transmitted 152 a modulation circuitry produces the IQ baseband signal mentioned above. Baseband modulator 150 drives the IQ carrier mixers 110 through a set of standard appropriate filters, amplifiers and drivers 154 whose characteristics and implementation details vary largely from one implementation to the other. IQ carrier mixers up convert the baseband signals to the carrier frequency. These circuits are not part of the invention and their detailed modes of operation are not important to understand it.

On the contrary, the baseband modulator 150 is specific to the invention and is explained in the following figures. If using an existing radio transceiver, e.g., a commercially available Bluetooth transceiver, the baseband modulator of the invention replaces the modulator that may be imbedded in the part. Only the radio part 100 is re-used. In any case, I and Q inputs (or any other alternate means allowing the modulation in phase and amplitude of the transmitted RF carrier; i.e.: a so-called polar modulator) are assumed to be accessible. Obviously, an alternate option for a cheap production part consists in replacing the baseband modulator in an application specific integrated circuit (ASIC) re-using the radio part design 100. Yet another alternative is to implement several exclusive modes of operation in a same ASIC, e.g., combining the regular Bluetooth mode of operation (a spread spectrum technique based on a frequency hopping over 79 different frequencies in the 2.4 GHz range) with the modulation technique of the invention explained in the following figures.

The receiver leg of the radio transceiver part 100 implements the converse operations managing to extract I and Q baseband signals from the RF signal received through the antenna. Generally, such a transceiver imbeds a switch 102 to isolate the input low noise amplifier or LNA 160 from the power amplifier 120 and to manage the bidirectional mode of operation. Typically, such a transceiver is under the control of a specialized or standard micro-controller (not shown). I and Q components are extracted from the received modulated RF signal (generally, a weak signal) by quadrature down conversion mixers 170 to eventually retrieve the baseband I and Q signals to be applied to the demodulator 180. Down conversion mixers are followed by an appropriate sophisticated circuitry 184 to restore I and Q to a level which is somehow independent of the level of reception of the weak RF signal. Circuitry 184, an integral part of the radio transceiver 100 includes various filters and variable/automatic gain control amplifiers (VGA). It possibly includes conversion to an intermediate frequency (IF) before restoring the baseband I and Q signals.

Similarly to the transmit leg, baseband demodulator 180 is specific to the invention and described in the following figures. The same remarks on how it can be implemented apply.

The radio part of the transceiver also contains a frequency control section 190 to generate and adjust clocks to operate, e.g., in the ISM 2.4 GHz range. This includes circuits such as: PLL (phase locked loop), V/NCO (voltage or numerically controlled oscillator) filters, etc. An external oscillator is required 192.

Figure 2:
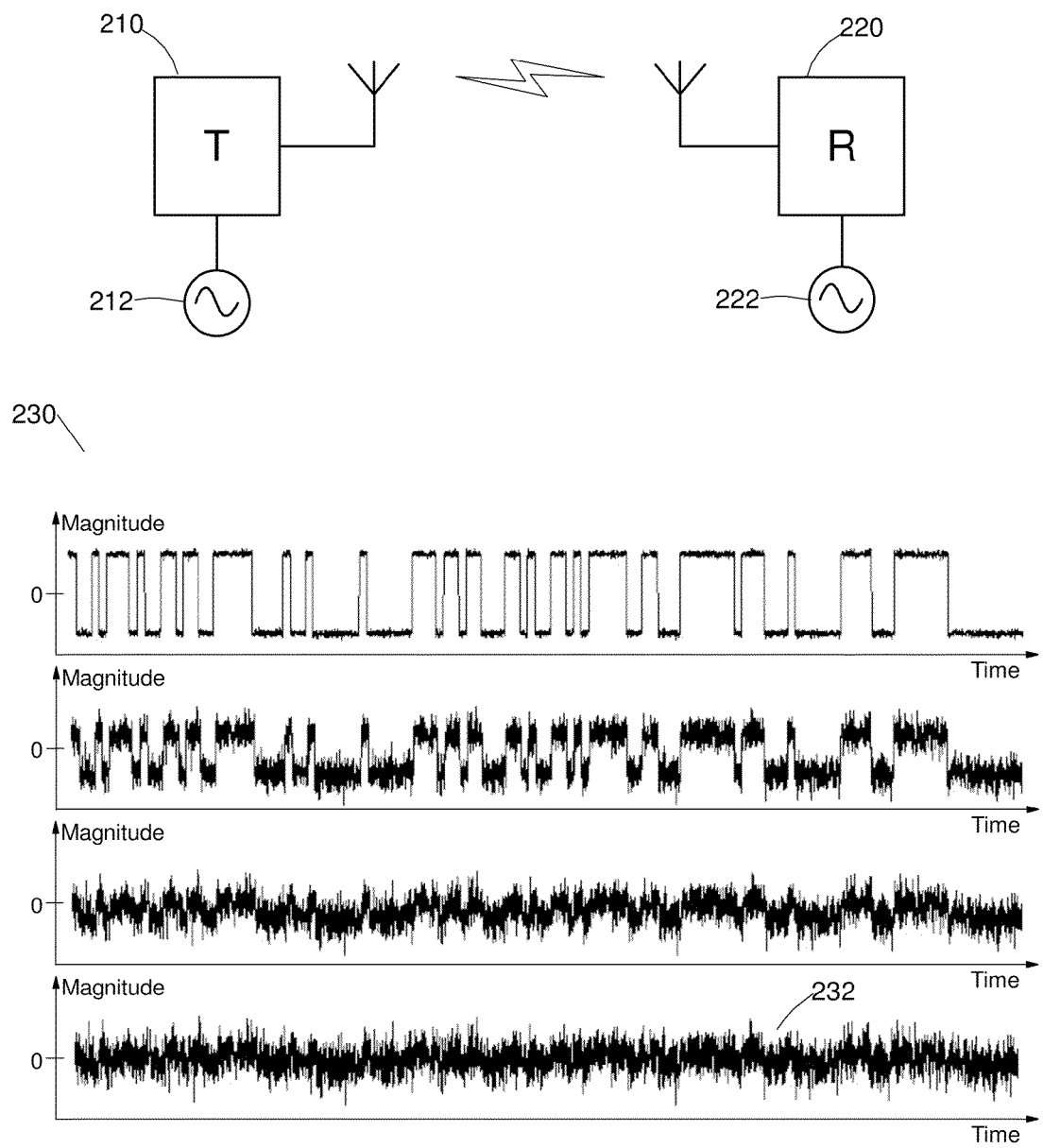
FIG. 2 discusses the transmission of a signal over the air between a transmitter and a receiver.

FIG. 2 discusses the transmission of a signal over the air between a transmitter and a receiver.

The maximum distance that can be reached depends essentially, at a given carrier frequency, of the power level at which signal is broadcasted on the air by transmitter 210 and of the sensitivity of the receiver 220. In the context in which the invention takes place (as discussed in the background section), the power level of the transmitter is set by ISM frequency band specifications and various standards like Bluetooth. Then, to allow operation on a world-wide basis, the emitting power cannot in practice exceed 10 dBm (i.e., +10 decibels vs. a reference power level of 1 mW which thus corresponds to 0 dBm).

The overall sensitivity of the receiver is conditioned by intrinsic characteristics of the input receiving device 220; generally, a low noise amplifier as shown in FIG. 1 160. Modern receiver designs made in standard technologies; i.e., technologies used for implementing integrated circuits and essentially utilizing MOS (metal oxide semiconductor) transistors, already exhibit excellent performances. Indeed, they are able to operate just 3 dB above the thermal noise of the input circuitry matching the antenna impedance (typically, 50 ohms). This means that an ideal receiver, impossible to implement though, could just be 3 dB better than current actual implementations.

Hence, communication technologies, taken into consideration the above limitations, already exhibits the best possible performances with hardware implementing devices typically capable of operating, in the case of Bluetooth, with a bandwidth of 1 Mbps over maximum distances of 10 meters.

In the same conditions (carrier frequency, emitted power, bandwidth used and intrinsic receiver sensitivity) there is however a technique, known under the general name of spread spectrum, which potentially allows an increase of the sensitivity of the receiver thus allowing communications over longer distances at the expense of a reduction of the effective data rate. The general idea is to use the available bandwidth to combine the data to be transmitted with a spreading sequence so that it becomes possible to discriminate, in the receiver, the transmitted signal even though the level of reception cannot permit to distinguish it from noise. This latter point is graphically illustrated in FIG. 2 with an arbitrary binary sequence. Depending on the reception conditions and distances between transmitter and receiver the received signal is progressively attenuated and finally becomes indiscernible from the environmental noise 232.

DSSS, which stands for 'direct-sequence spread spectrum', is the most used spread spectrum technique. It is able to achieve the above objective of increasing the sensitivity of receivers beyond what thermal noise allows. For example, DSSS is used by the US military global positioning system or GPS which has also been made available for civil applications by the US department of defense. It is based on a constellation of more than thirty satellites which permanently broadcast signals so that the myriad of specialized GPS receivers that are now in use all over the world can determine precisely their own position, speed and altitude provided good signals can be simultaneously received from at least four satellites. For civil applications, each satellite broadcasts a signal on a same frequency (1575.42 MHz) however with its own spreading sequence so that they can be uniquely identified by the receivers. In DSSS, the spreading sequence is a pseudo random noise (PRN) code. GPS civil PRN sequence is a pretty long binary sequence of 1023 'chips' or bits. The longer the sequence of the code the higher the gain in sensitivity of the receiver can be. It has been shown that a coding gain of 3 dB can be expected each time the coding sequence is doubled. Thus, a sequence of 1023 or $2^{10}$ bits can indeed provide a coding gain of about 30 dB.

The above value (30 dB) is the gain in receiver sensitivity which is also expected to reach the objective of the invention. Objective which is to multiply by two orders of magnitude the distance permitted between transmitter and receiver, i.e., from 10 meters to 1 kilometer. This is obtained at the expense of a reduction of the effective data rate from 1 Mbps (the Bluetooth bandwidth) which must be divided by the length of the code, about $10^3$, to get an effective data rate of just 1 kbps.

Such data rate is however sufficient for the applications considered by the invention, i.e.: telemetry, monitoring of sensor devices, etc.

Unfortunately, the spread spectrum scheme of GPS cannot be transposed and applied to the invention. The chief reason lies in the requirements of transmitter and receiver independent clocking systems (212, 222). The devices considered by the invention are low-cost devices which cannot afford to implement expensive, very precise and stable clock systems as it is the case with GPS. Moreover, the mode of operation is not the same. On one hand, GPS satellites are permanently broadcasting their signals (generated from an atomic precise clock). On the other hand GPS receivers are either permanently turned on or stay on for a significant period of time and can (and must anyway) stand a pretty long acquisition of the GPS transmitted spreading code before becoming operational. Acquisition which consists in retrieving out of the environmental and thermal noise 232 which spread sequence is actually transmitted (if several are used as in the case of GPS) its exact frequency and phase shift. This must be done from a local clocking system which needs to be natively as precise and stable as possible to shorten the acquisition process. Acquisition basically consists in successively trying all possible combinations of frequency and phase shifts (in a range depending of the relative accuracy of the independent clocking systems). This must be done until a correlation can be found over a complete code sequence length. A huge number of combinations may have to be tried.

On the contrary, devices of the invention may not always be powered to reduce energy consumption and must be able to quickly wake up and synchronize to transmit at regular intervals the status of the monitored sensors. Moreover, this must be achieved from independent low-cost clocking systems whose accuracy, temperature dependence and stability is generally specified in an overall plus or minus 40 ppm (parts per million) range, i.e.: about plus or minus 100 kHz at 2.4 GHz. Combined with the requirement of having to support a long spreading sequence (e.g.: 1023) to obtain the coding gain necessary to reach the targeted communications distance (1 Km) the challenge cannot be met with DSSS.

Figure 3:
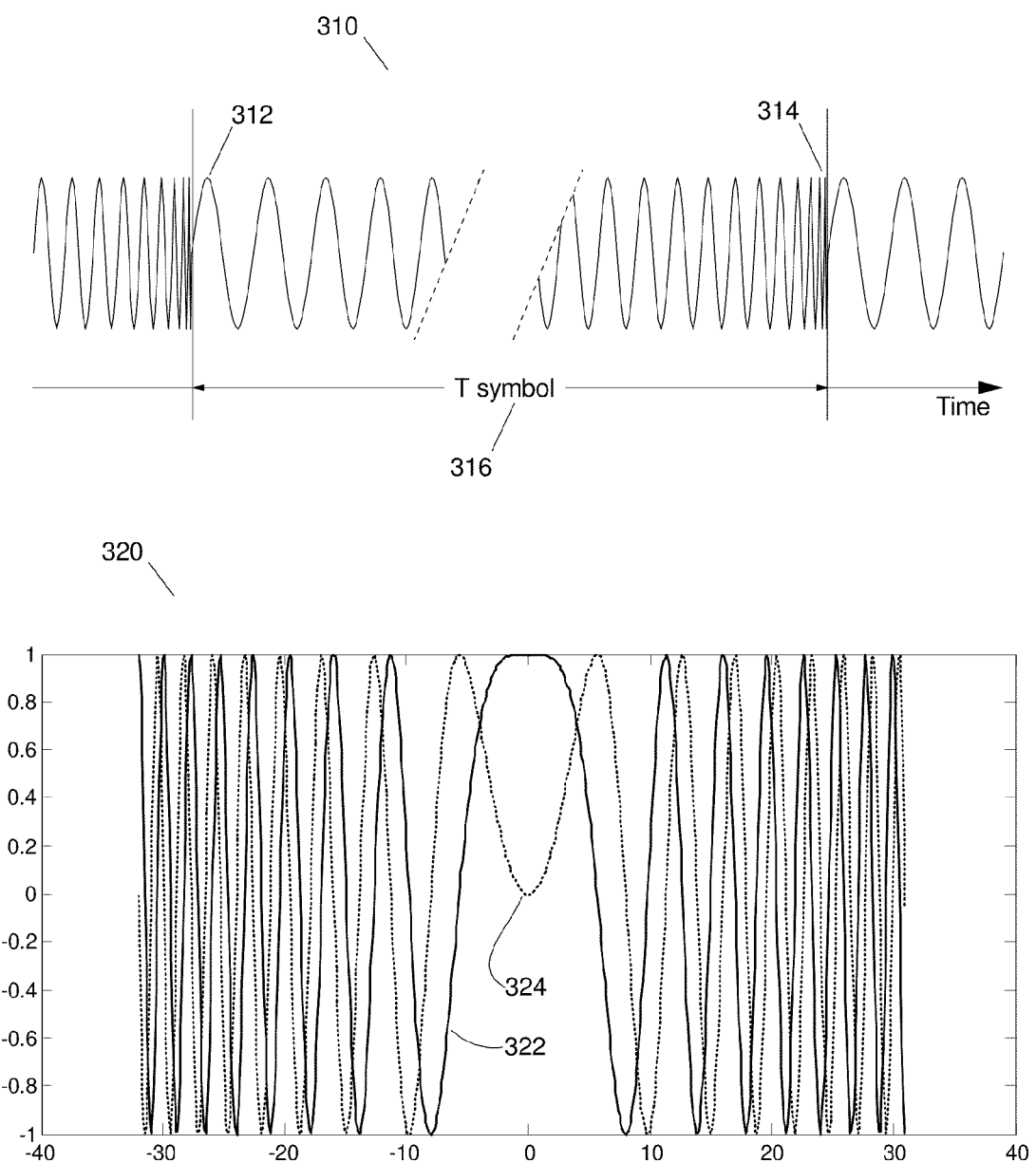
FIG. 3 describes through a particular example the principle of the spreading technique used by the invention.

FIG. 3 describes through a particular example the principle of the spreading technique used by the invention.

To overcome the above described problems, and however obtain the necessary coding gain, the invention manages to use another spread spectrum technique. Technique which is seldom used in the field of data communications. The spreading of the spectrum is obtained by generating a chirp signal whose frequency is continuously varied from an initial F0 frequency to a final F1 frequency. An example is shown 310. F1 314 can be higher (as shown) or lower than F0 312 so that an up chirp or a down chirp is respectively generated. A key advantage of such a spreading technique is that a timing offset and a frequency offset between transmitting and receiving ends become equivalent reducing accordingly the complexity of the receiver which has only to consider a mixed frequency and/or timing offset to retrieve symbols.

The frequency difference, F1 minus F0, represents the spectral bandwidth of the signal. In the example used to illustrate the invention, based on Bluetooth technology, this must correspond to the bandwidth used by this particular technology, i.e., 1 MHz. Hence, in the RF domain, a chirp signal according to the invention is represented by a frequency modulation of the carrier whose central frequency is continuously varied from −500 kHz to +500 kHz around the chosen frequency carrier Fc (in the 2.4-2.5 GHz ISM range in this example) when broadcasting a chirp symbol. Hence, the corresponding baseband signal can be viewed as being comprised between these two values (−500 kHz to +500 kHz).

The duration of the chirp symbol must correspond to the expected effective data rate of the application, i.e., 1 kHz in the example used to illustrate the invention. Hence, the spreading factor is still $10^3$ as with the DSSS technique discussed in FIG. 2 so that to obtain the same improvement of the receiver sensitivity. Then, each chirp symbol, carrying at least one bit of information, needs to be transmitted in 1 millisecond 316.

The invention assumes that all modern standard techniques to perform signal processing in a numerical form (i.e., digital signal processing or DSP) are potentially useable to implement the invention. Especially, Fourier transforms are used to convert signals from the time domain to the frequency domain so that received signal can be efficiently analyzed as discussed in the following description of the invention. Efficient fast Fourier transform (FFT) algorithms exist that can be implemented in a numerical form on standard appropriate computing hardware. Also, the invention assumes that signal processing is carried out in the domain of complex numbers, i.e., with a real and an imaginary part. This fits well with the implementation of the radio transceiver described in FIG. 1 where quadrature IQ modulator and demodulator are employed that can be directly driven by a two-value complex signal. Also, this implies the definition and use of negative frequencies when spectral analysis of a signal needs to be considered.

Lower schematic 320 of FIG. 3 shows such a representation of an exemplary baseband chirp symbol. It has a real part 322 and an imaginary part 324 so that instantaneous frequency and phase of the signal can be derived at any point in the baseband range. For a sake of clarity of the diagrams, the spreading factor of this example and following ones is only of 64 (actually, between −32 to +31) while higher values of the spreading factor are needed to achieve the objective of the invention as previously discussed.

Diagram 310 is representative of the RF carrier broadcasted by the transmitter antenna once modulated by the chirp. Diagram 320 shows the baseband chirp signal before up-conversion, hence the separated I & Q components.

Figure 4:
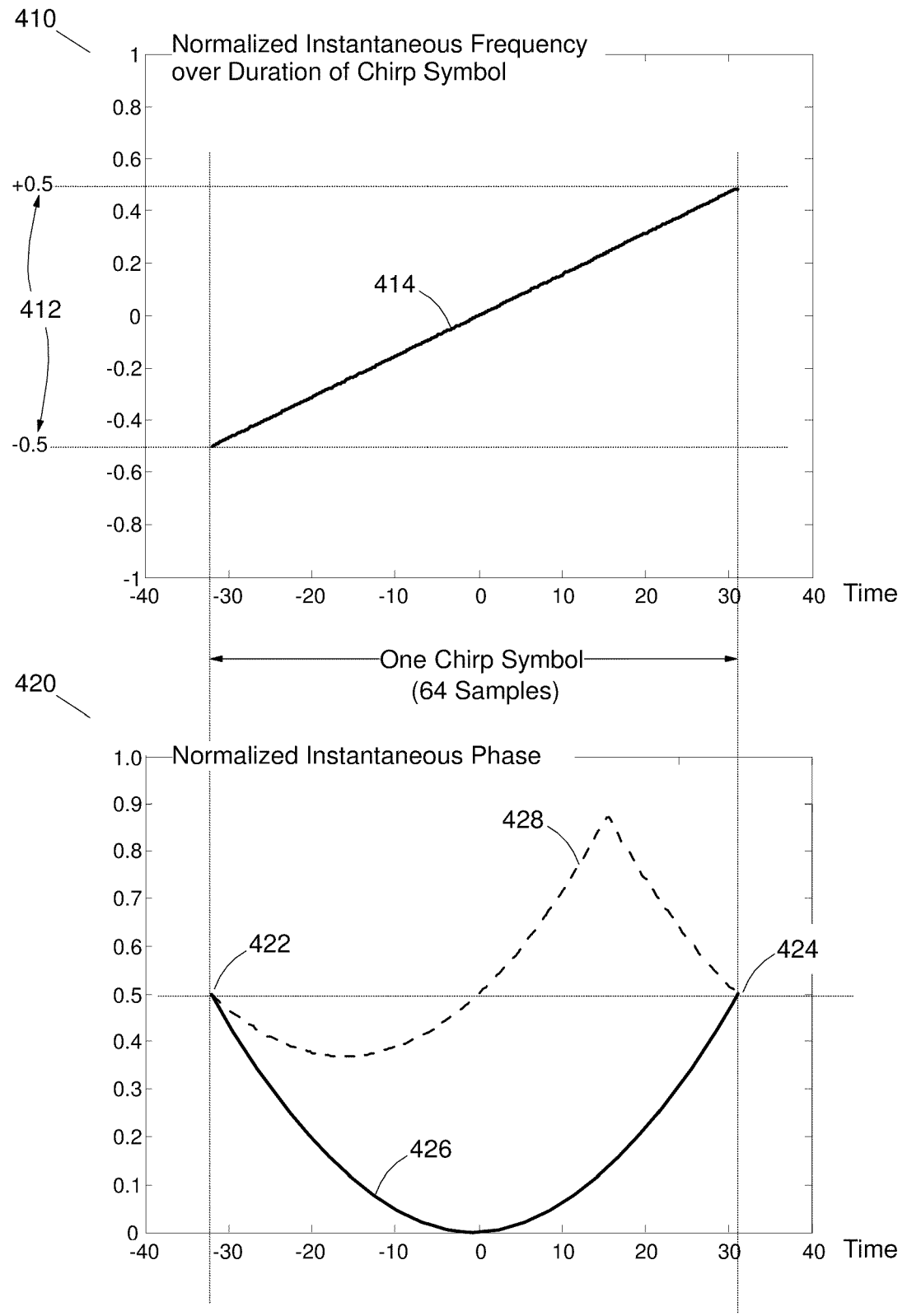
FIG. 4 shows with examples how chirp symbols must be generated to comply with the requirements of the invention.

FIG. 4 shows with examples how chirp symbols must be generated to comply with the requirements of the invention.

As already mentioned above, chirp symbol is constructed so that instantaneous frequency is continuously varied from an initial frequency F0 to a final frequency F1. This is shown in diagram 410 where frequency range is normalized 412. In this example, instantaneous frequency is increasing linearly over the whole duration of the chirp symbol 414, i.e., from a lower frequency F0 to a higher frequency F1. As mentioned previously, a down chirp could be as well considered, i.e., a chirp in which instantaneous frequency is decreasing linearly.

The lower diagram 420 shows the instantaneous phase of a chirp symbol according to the invention. The key characteristic is that symbol must be constructed so that the instantaneous phase at beginning of symbol 422 must be the same as the one at end of symbol 424. In between, the phase changes as shown, e.g., by lower curve 426. This phase curve is typical of the way phase changes over the whole duration of a raw chirp symbol according to the invention; i.e., a symbol which carries no data information and, thus, which is not modulated. As further discussed in the following, raw chirps are more specifically used as preamble symbols to allow receiver side to quickly synchronize.

The inter symbol continuity of phase required by the invention is intended to permit combining and processing together received chirps with locally produced chirps in spite of the inevitable frequency and/or timing offset that exists between the independent low-cost clocking systems having produced them (respectively, transmitter on one end and receiver at the other end). As explained in the following description the synchronization problems described with the direct spread spectrum technique (DSSS) in FIG. 2 will thus be overcame.

If one except above requirements, the invention does not assume any particular way of encoding data into a chirp symbol so that user data information can be forwarded to a remote location. All techniques known from those skilled in the art for modulating a carrier signal, here a chirp, can potentially apply provided the above requirement is met, i.e., ending and beginning phases match. A standard technique to transport data information indeed consists in modulating the phase of a carrier. The invention supports this kind of data modulation. Hence, depending on the data values to be transported by a chirp symbol, various phase curves may have to be applied for generating a particular symbol. In any case, as shown 428, starting and ending phases must match. Although modulation techniques of a chirp are beyond the scope of the invention this aspect is further discussed in FIG. 7.

Figure 5A:
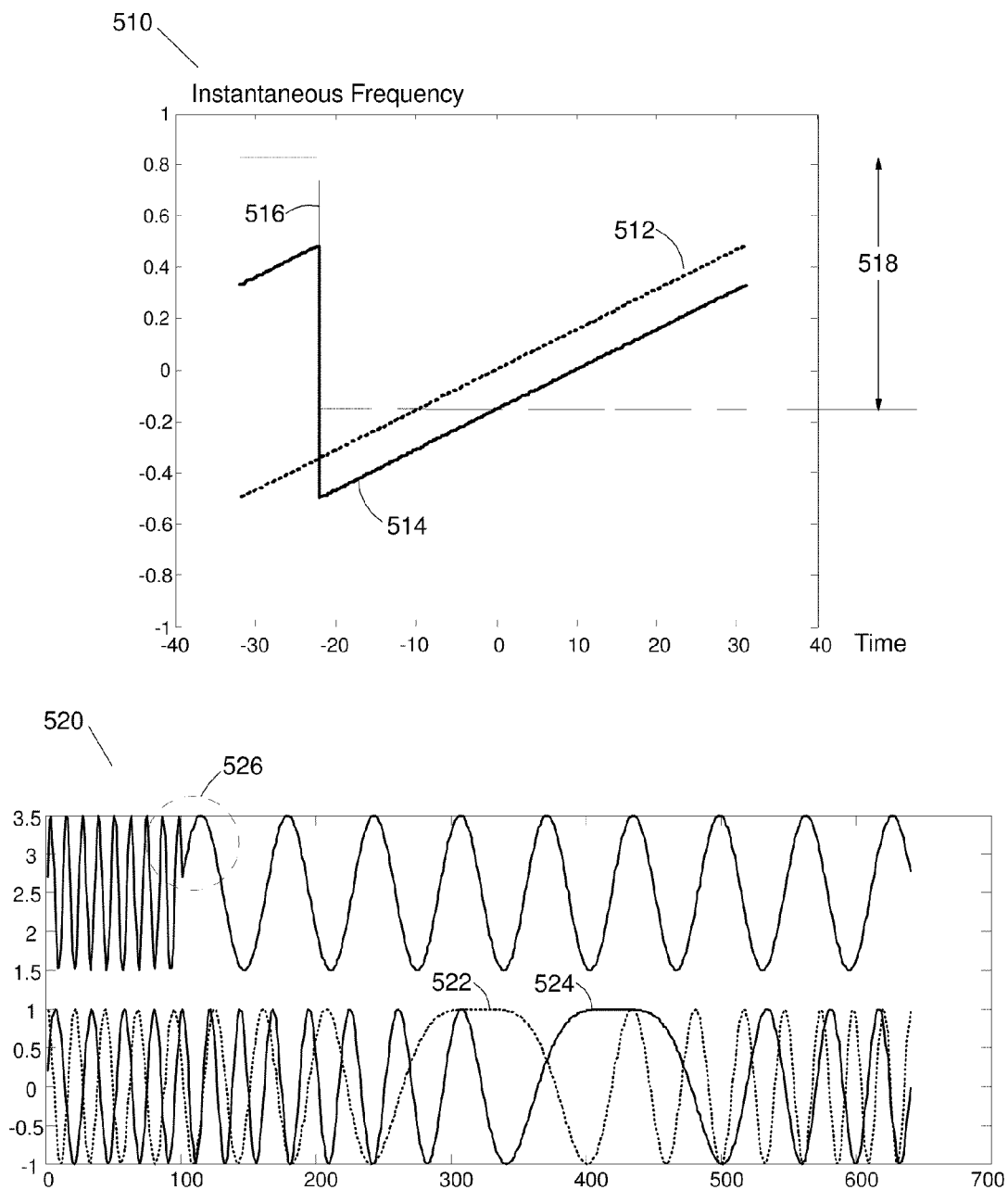
FIGS. 5a, 5b, 5c discuss, and illustrate with examples, how a chirp symbol can be received without requiring precise and stable clocking systems in transmitter and receiver.
Figure 5B:
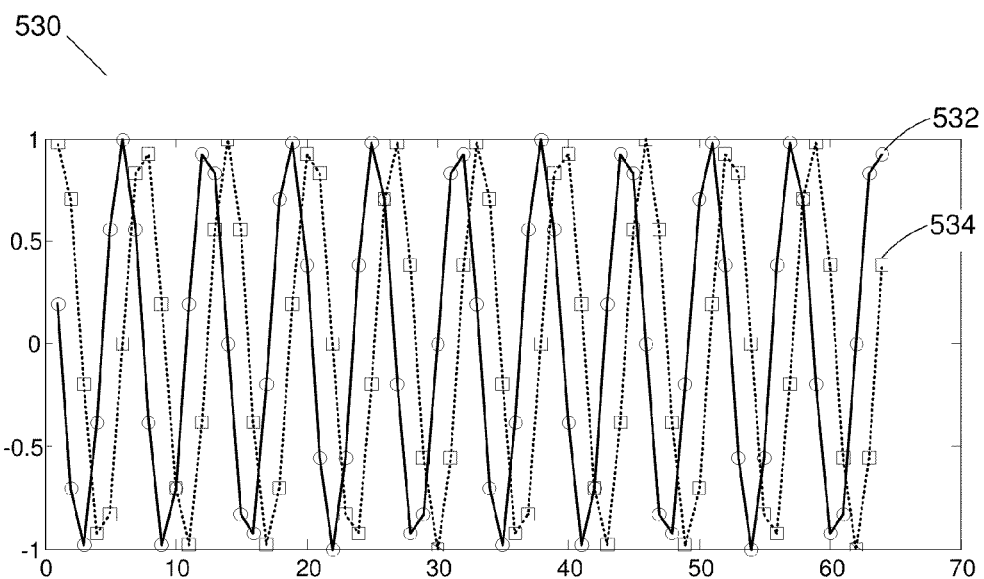
Figure 5B:
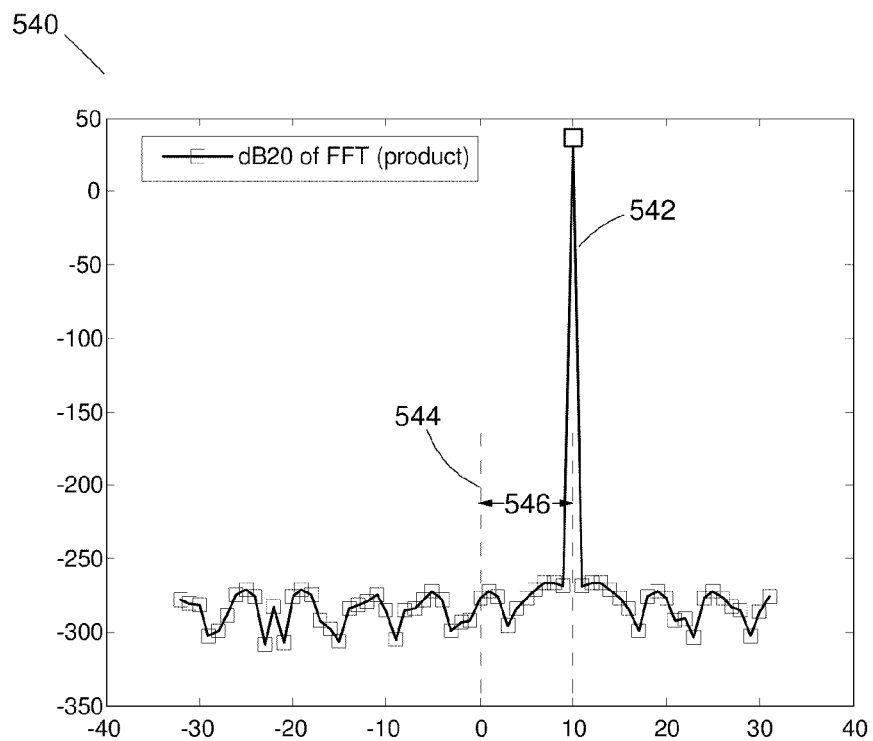
Figure 5C:
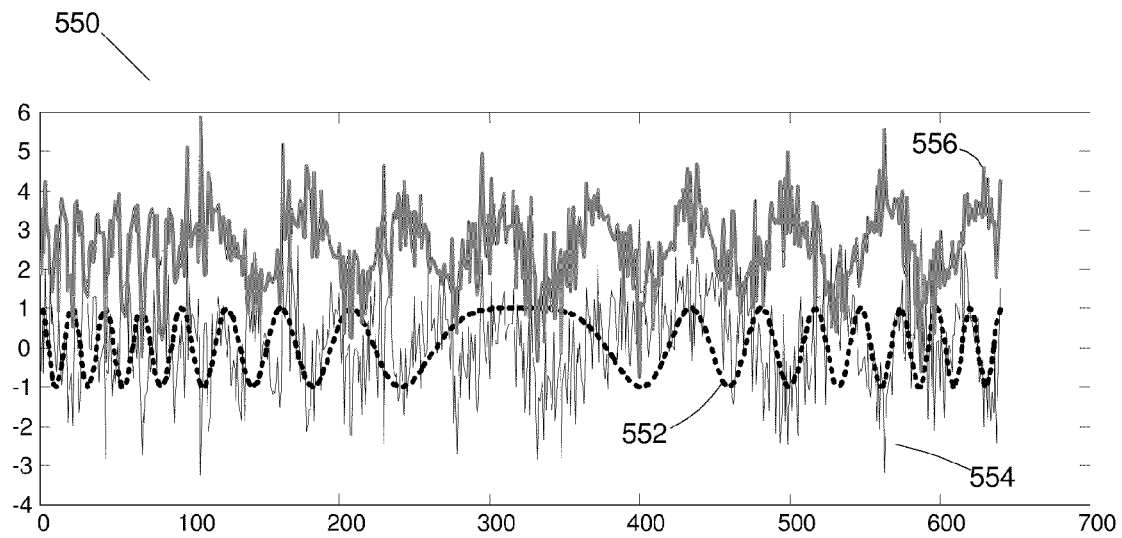
Figure 5C:
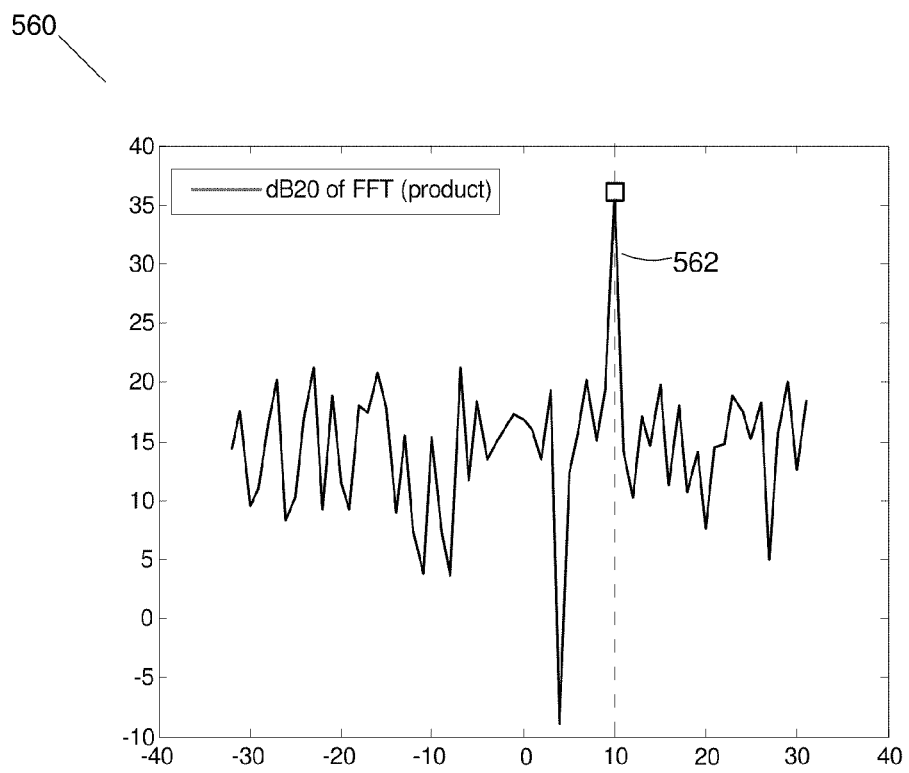

FIGS. 5a, 5b, 5c discuss, and illustrate with examples, how a chirp symbol can be received without requiring precise and stable clocking systems in transmitter and receiver.

Diagram 510 shows the instantaneous frequency of a locally generated chirp 512, i.e., from the clocking system of the receiver. As in previous figure the spreading factor N of this example is 64. With a chip rate at 1 MHz chirp symbol duration is then 64 μsec. With respect to the local clock system the frequency increases linearly over the whole chirp symbol duration.

Due to the assumed timing offset that also exists between transmitter and receiver, a steep change of the instantaneous frequency of a received chirp 514, with respect to the local clock, can be observed at some point of time. Position of the step depends on the actual value of this offset. However, both chirps (received and locally generated) can be combined. First, the receiver multiplies a received chirp by a locally generated conjugate chirp, i.e., a chirp whose frequency linearly varies from F1 to F0 (instead of varying from F0 to F1). Then, the product 516 result of the multiplication is built showing, in this example, a down step 518 due to the timing offset between the clock systems. The conjugate chirp must also comply with the same requirement as the one applying to the transmitted chirp, i.e.: the instantaneous phase at beginning must be the same as the one at end of chirp. The phase at beginning and end of the chirp as generated by the modulator may not be necessarily the same as the phase at beginning and end of the chirp received at the demodulator. In particular, the overall phase of the received chirp is anyway arbitrarily shifted by the transmission channel.

After which, a FFT is performed on the 64 products of the respective samples of the received chirp and of the locally generated chirp. What is important to notice however, as shown hereafter, is that the two product frequencies 516 build up in a same so-called output 'bin' of the FFT because of the folding resulting of the sampling.

Diagram below 520 is another view, in the time domain, of diagram 510. It is done with an ×10 over-sampling (hence, max value of 640 on the X axis) to better see the steep frequency transition of the product 526. In this diagram, which plots only the real part of the baseband signals, reference 522 is the locally generated chirp and 524 the received chirp.

In reality the product of the two chirps is sampled at the chip rate, i.e., at 1 MHz in this example, thus obtaining 64 samples as shown in diagram 530 of FIG. 5b where real 532 and imaginary 534 parts are plotted.

Then, as mentioned above, a FFT is performed on the 64 samples of the product. The result of the conversion from the time domain to the frequency domain is as shown in diagram 540. The Y axis shows the spectral energy contained in each of the 64 bins of the FFT with an arbitrary scale in dB (20 $\log_{10}$ of energy ratios). In the absence of noise, as it is assumed in this diagram, the energy is concentrated in a single frequency bin of the FFT 542. If the two chirps of the product were frequency aligned (i.e., produced with an exact same clock frequency) the energy would have been concentrated in the central bin 544 corresponding to a sinusoid having a null frequency (a DC level). The observed shift 546, i.e.: 10 samples, is indicative of the frequency and/or timing offset that exists between the two independent clocking systems. Bin content is also a complex number with an associated amplitude and phase.

The above scheme still works in presence of a high level noise as illustrated with following diagrams 550 and 560. Except the noise, diagram 550 is comparable to diagram 520, i.e., shown with an ×10 over sampling of the chirps (solely for the convenience of display). The locally generated chirp 552 is obviously not noisy. The received chirp is 554 and the product 556. In spite of the noise, the FFT result 560 still shows clearly the peak 562 corresponding to the frequency and/or timing offset of the clocking systems.

Hence, as a result of the FFT on the product of a received chirp by a locally generated conjugate chirp the receiver knows immediately what offset exists between the two clocking systems.

Thus, there is no need of a very long acquisition process during which all possible combinations of frequency and phase shifts must be successively tried in an attempt to get a correlation over a complete spreading sequence as with DSSS technique. An impossible task anyway, as previously discussed when low-cost clocking systems combined with long spreading sequences need to be used.

Figure 6:
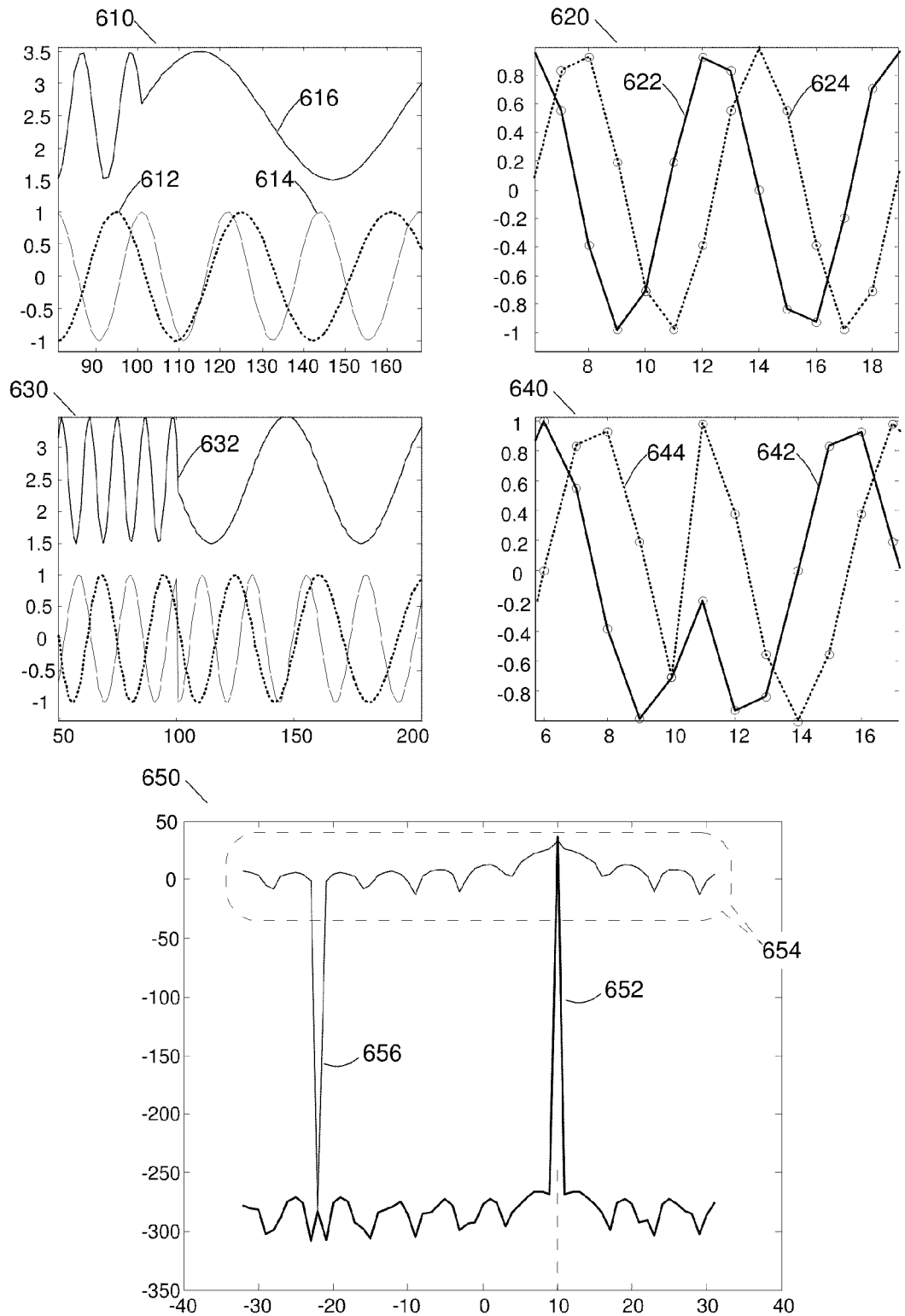
FIG. 6 further discusses and illustrates with examples the requirement for the inter symbols phase continuity.

FIG. 6 further discusses and illustrates with examples the requirement for the inter symbols phase continuity.

Diagram 610 shows the case where the inter symbol requirement is met. This diagram is similar to 520, i.e., with an ×10 over sampling for the convenience of display. It shows the real part of the two chirps, local 612 and received 614 and their product 616. The diagram on the right 620 corresponds to what is obtained with the actual ×1 sampling, i.e., at 1 MHz in this example. Real 622 and imaginary 624 parts of the product are plotted.

Diagram 630 shows the case where the inter symbol requirement is not met. In this example there is a half period (π) shift 632 at transition between F1 and F0. The diagram on the right 640 corresponds to what is obtained with the actual ×1 sampling. As above real part 642 and imaginary part 644 of the product are plotted.

As shown on diagram 650 below this has a dramatic impact on the result of the FFT. If requirement for phase continuity is not followed the energy is spread in the general case over all bins as shown 654. Actually, in this particular example used to illustrate the invention, because there is exactly a half period phase shift at transition, a cancellation occurs in one of the bins, hence the notch observed 656. Anyway, FFT result cannot be exploited. On the contrary, with inter symbol phase continuity the result is as expected, i.e., accumulated in a single bin 652 which is indicative of the frequency and or timing offset that exists as a result of the frequency offset between the independent clocking systems and of the timing offset for generating the chirps.

Figure 7:
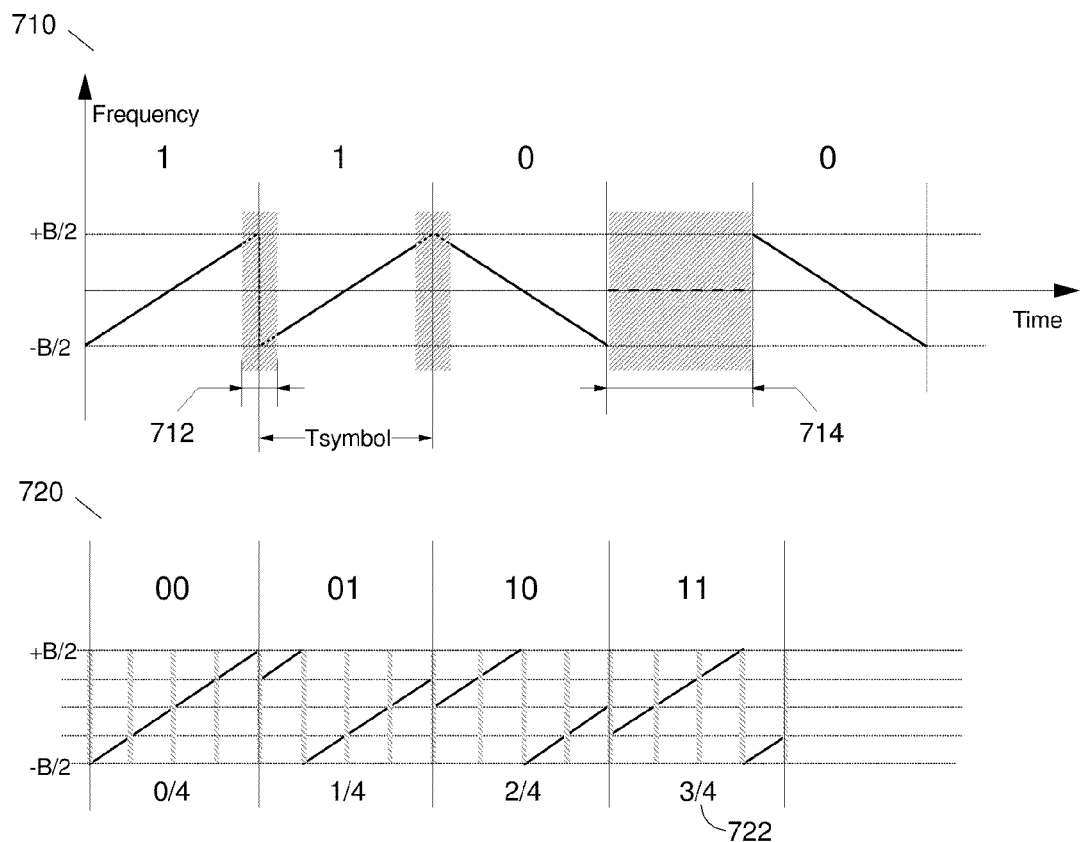
FIG. 7 briefly reviews a few exemplary techniques so that chirp symbols can be modulated to carry user information.

FIG. 7 briefly reviews a few exemplary techniques so that chirp symbols can be modulated to carry user information.

As already mentioned the scheme of the invention does not assume any particular method to modulate chirp symbols and forward data information to a remote location.

If only one bit of information is transported by each chirp symbol a straightforward method consist in using up chirps and down chirps so that a binary 1 is, e.g., carried by an up chirp and a 0 by a down chirp 710.

It is worth noting here that implementation constraints may lead to introduce a dead time 712 at inter symbol border (during which the transmitter is turned off) so that a controlled transition between the two extreme frequencies (F0 and F1) of the chirp can be internally achieved in transmitter and decoded in receiver. Then, the requirement on the phase continuity must be interpreted as if the symbol had continued normally, i.e., without the dead time.

Another approach may be required in a multi-path transmission environment. In order to avoid inter symbol interferences (ISI) due to echoes, a significant dead time between symbols may have to be introduced 714. In which case, to simplify the receiver, a virtual phase may have to be attributed to the dead time during which transmitter is kept silent. Hence, to adhere to the phase continuity inter symbol requirement, symbols must all start with this defined virtual phase. This way of doing may also prevent decoding errors from accumulating in successive symbols.

Another known technique to modulate a chirp consists in frequency rotating the symbols. More than two states may be defined with this method. If, for example, four rotations are defined 722 two bits of information can be carried in each symbol so that the data rate is twice the symbol or baud rate. Like above, a dead time may have to be introduced at each symbol transition and at each possible rotation border.

Also, the phase of the chirp may be modulated to imbed information to be transported. A very simple way of doing this consists in generating a complying chirp symbol, then to apply on it a complex rotation of, e.g.: 0, 90, 180 or 270 degrees before transmission. Although, in this case, the various modulated symbols no longer exhibit the phase continuity property it is important to notice that may not be required for the payload part of a transmitted message. The phase continuity is actually only required for the non modulated (raw) symbols of the message preamble (as discussed in FIG. 10) so that to allow the acquisition of the timing and frequency offset information. Once the receiver is aligned with the transmitter (both in timing and frequency) there is no need any more for phase continuity because the locally generated chirp is time aligned with the one transmitted, hence phase information of the FFT bin can be used to encode information.

Figure 8:
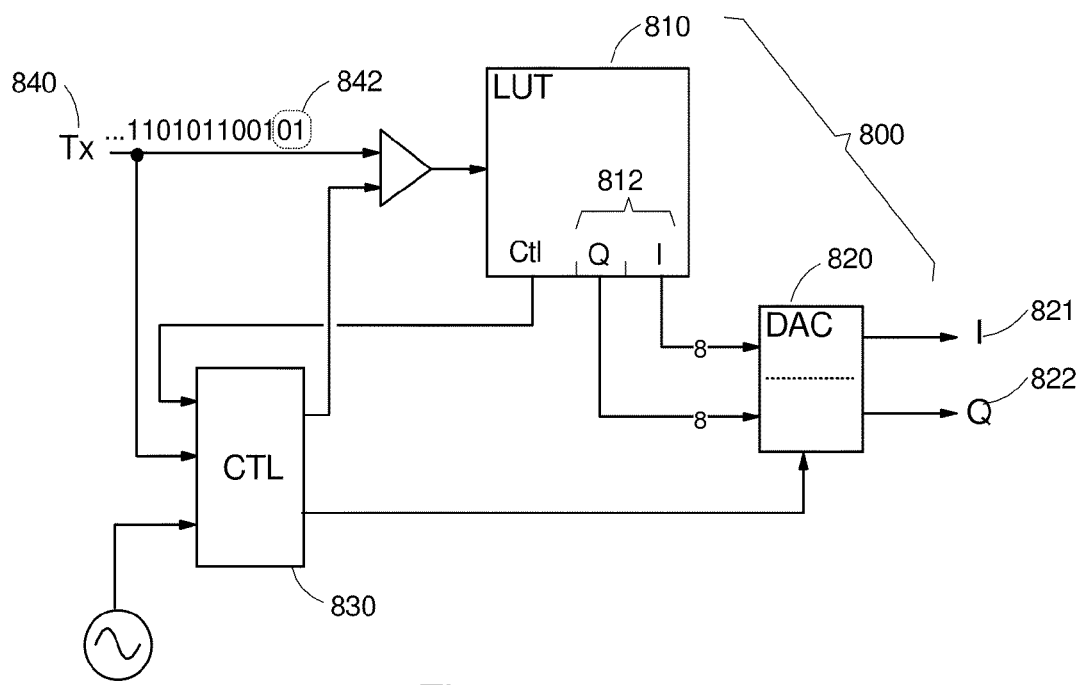
FIG. 8 depicts an exemplary implementation of a baseband modulator according to the invention.

FIG. 8 depicts an exemplary implementation of a baseband modulator according to the invention.

The invention does not require any particular implementation of a modulator according to the invention as shown in FIG. 1 150. An exemplary implementation that can be simply carried out with discrete standard electronic components or imbedded in any form of integrated and/or programmable circuit is described. Numerous alternate implementations are possible; especially, those that would make use of the inverse fast Fourier transform (IFFT) to convert a signal from the frequency domain to the time domain for generating a chirp symbol.

In this implementation the modulator includes a lookup table or LUT 810 and a digital to analog converter or DAC 820 which, together, form the means for precisely controlling 800 the instantaneous frequency and phase of any chirp symbol.

DAC must be a dual DAC capable of generating the in phase (I) 821 and quadrature phase (Q) 822 components of the baseband analog signal to be up converted by the transmitter leg of the RF transceiver as discussed in FIG. 1. I and Q analog components are converted by the dual DAC from a series of corresponding two binary words 812 stored in the LUT. Hence, each type of symbols which needs to be transmitted is pre-computed and stored in the LUT which is typically implemented by a ROS (read only storage) or an EPROM (electrically programmable read only memory).

In the general case, a minimum of three symbols need to be predefined and stored. This includes a non modulated raw symbol that will be essentially used by receiver in a preamble of any message to quickly synchronize. This is further discussed in FIG. 10. Then, a minimum binary two-level encoding is required. Hence, a '0' symbol and a '1' symbol must also be stored although one of them could also use the raw symbol thus lowering the requirement to two symbols only (a raw symbol representing also, e.g., the '0' modulated symbol plus the '1' modulated symbol). If encoding of a chirp is devised to carry more than two bits per symbols (i.e., $2^n$ bits) four, eight, and more symbols may need to be predefined and stored. The number of binary words that must be stored to define a single symbol depends on the chosen spreading factor. To comply with the objective of the invention an ×1000 spreading factor must be used in which case each I and Q component of the transmitted baseband signal will require a minimum of 1 k words to precisely define instantaneous frequency and phase of the corresponding chirp symbol. The width (number of bits) of each stored word depends on the accuracy with which the analog signal needs to be defined. If, for example, a range of +128/−127 analog levels are defined, 8-bit words will be stored for defining I and Q components.

Typically, LUT and DAC are under the control of a microcontroller 830. The flow of bits to be transmitted 840 is, e.g., serially received. Each group of n-bit to be transmitted is used to address directly or not (i.e., through the controller) a particular symbol stored in the LUT. For example, if encoding of the chirp is defined with four levels, two bits at a time 842 need to be processed so as to choose among four stored symbols. LUT will also generally comprise extra control bits to help microcontroller performing the task of encoding the flow of bits to be transmitted.

Those skilled in the art will recognize that all sorts of modifications may be brought to the above brief description of the modulator without departing from the spirit of the invention. Simplifications or, on the contrary, a higher level of sophistication may have to be considered by the designer of the modulator. This is largely dependent on the application considered and on the choice of the chirp modulation technique retained to carry user information. For example, if the first simple modulation scheme mentioned in FIG. 7 is retained 710, only two symbols need actually to be stored: a non-modulated up chirp and a non-modulated down chirp. Either one may also be used for synchronization of the receiver discussed in FIG. 9.

Figure 9:
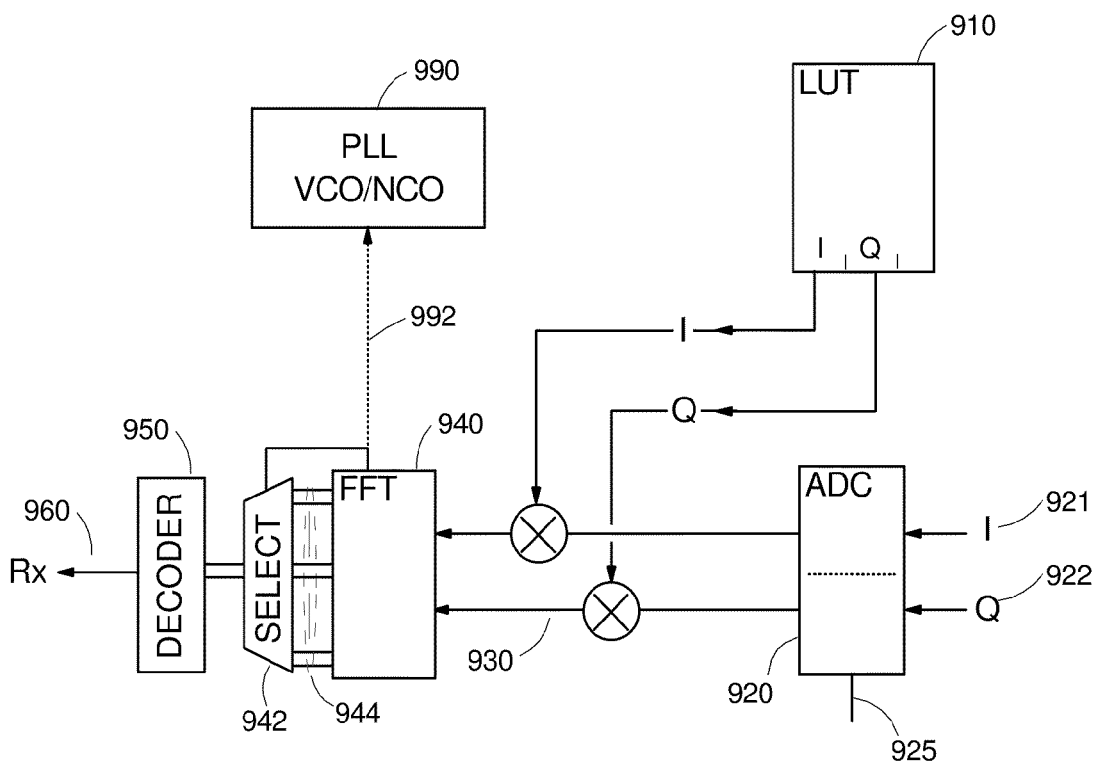
FIG. 9 discusses an exemplary implementation of the demodulator.

FIG. 9 discusses an exemplary implementation of the demodulator.

As with the modulator, the invention does not require a particular implementation of the demodulator. Especially, FFT function 940 can make use of any of the numerous techniques developed in software, firmware, hardware, or in combination, that have been devised since FFT are in use in the field of digital signal processing. As described in FIGS. 5a, 5b, 5c the received signal is assumed to be down converted through the receiver leg of RF transceiver to an analog baseband signal having an in phase 921 and a quadrature phase 922 component. The two components of the baseband signal are then sampled and converted into a digital form by, e.g., an analog to digital converter ADC 925 at a rate corresponding preferably to the factor used by the transmitter for spreading the information over the chirp signal. In the examples used to illustrate the invention in previous figures, 64 samples have been considered. To achieve the gain of receiver sensitivity expected by the invention a higher spreading factor has however to be used (typically, an ×1000 spreading factor) which increases accordingly the number of samples. Sampling signal 925 is derived from the local clocking system. Then, the sampled baseband signal is multiplied 930 in the digital domain by a locally generated conjugate chirp, i.e., a chirp whose frequency linearly varies from F1 to F0. The means for generating the conjugate chirp may be the same as the one used for the modulator, i.e., conjugate chirp can be numerically stored in a LUT 910 used as input to a digital multiplier 930. There are as many words stored in the LUT as there are discrete samples generated by the ADC 920 of the received baseband signal.

Depending on the application and performances required by the system, LUT of modulator and demodulator can share a same hardware with the appropriate multiplexing functions (not shown) since, anyway, such a transceiver is not generally devised to transmit and receive simultaneously. As with the modulator, the whole demodulator functions are preferably under the control of a microcontroller, generally a common control function 830 also shared between modulator and demodulator.

Then, the product of the locally generated chirp by the one received is applied, on a per sample basis, to the discrete FFT (DFFT) in order to be converted in the frequency domain as discussed in FIGS. 5a, 5b, 5c. Thus, there are as many output bins of the FFT 944 as there samples of the product. If a received chirp, generated with the method of the invention, is indeed present in the receive signal then a peak of energy will be found in a single frequency bin of the FFT. The corresponding bin is indicative of the frequency and/or timing offset that exists between transmitter and receiver systems.

The information on the offset 992 can be optionally used to adjust the frequency of the local clocking system including PLL and VCO/NCO 990 so that it becomes eventually aligned on the one of the transmitter for the subsequent received chirps. In which case the bin activated will move to the central bin. However, this may not be necessary. The offset bin having collected the energy of chirp products can just be selected 942 and used directly for all subsequent received chirps.

A tracking system of the active bin may have to be implemented in the receiver if enough stability of the local and/or clocking system cannot be guaranteed for the whole duration of a received frame of chirps.

When data modulated chirps are received selected bin content is further analyzed (amplitude and phase) to extract the encoded information. Structure of the decoder 950 is highly dependent on the way data information is encoded in the chirps. Several methods have been suggested in FIG. 7. Whichever method is used decoder manages to extract the received data information so that it can be delivered to the processing system.

Also, it should be noticed that the exemplary implementations of the modulator and demodulator of FIGS. 8 and 9 assume that interface with the RF transceiver is achieved through two analog signals each having an in-phase (I) and a quadrature phase (Q) component. Depending on the application and specific implementations considered this interface could be carried out as well in a digital form in which case DAC 820 and ADC 920 would not be necessary since the I and Q would delivered or received in a digital form at a rate corresponding to the spreading factor in use.

Figure 10:
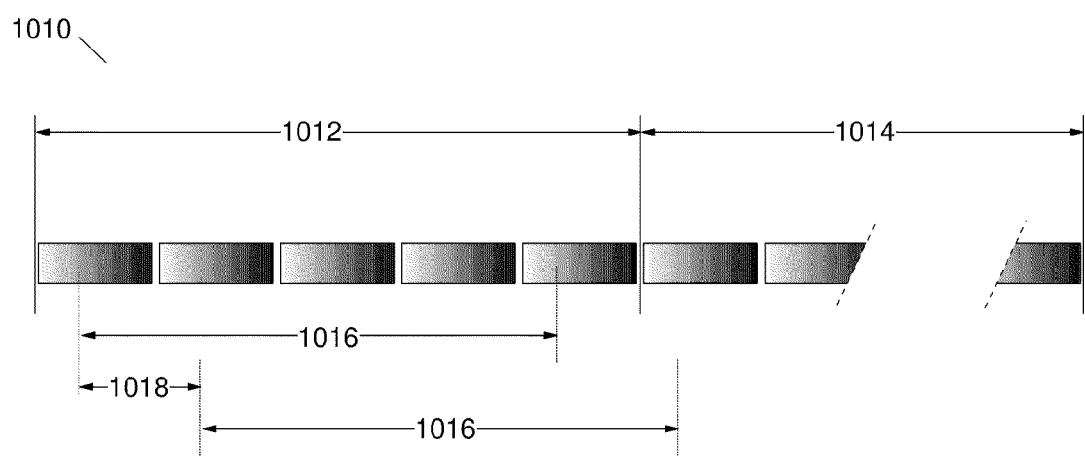
FIG. 10 briefly discusses, and illustrates with an example, the forwarding and receiving of a frame of chirps.

FIG. 10 briefly discusses, and illustrates with an example, the forwarding and receiving of a frame of chirps.

In the context of the invention, to forward user data information to a remote location, a data frame must include a preamble including a few, preferably, non modulated raw chirps. Preamble will be used by the listening receiver to quickly synchronize and catch a message sent by a remote transmitter. As discussed above, this may just consist in selecting the output FFT bin in which a peak of energy is found. In a typical application of the invention, the remote transmitter may just be kept powered on long enough to transmit the user information and, possibly, to receive an acknowledgement from the receiving part. This is achievable with a low complexity receiver both on transmitting and receiving parts. With the direct spread spectrum technique the transmitter would be about the same complexity. This is the receiver part of the transceivers that is not practically implementable as previously discussed.

Hence, data frame is, e.g., as shown 1010 including a few non modulated chirps as preamble 1012. The user information is carried in the subsequent chirps 1014.

In a preferred mode of realization of the invention, the preamble is comprised of five chirp symbols that are not modulated. Then, a listening receiver analyzes the signal to be received on the expected RF transmission frequency. This is done over a sliding window of four consecutive symbols duration so that a preamble can be entirely contained in the window as shown. Window is shifted of one symbol duration (i.e., N samples of the received signal, where N is the spreading factor used) at each attempt of retrieving a preamble 1018.

To ease the detection of a preamble, which is the critical point to establish quickly the communication link, the results of four consecutive FFTs are added and averaged so an extra gain of 6 dB of the receiver level of detection can be expected. To actually reach this gain, addition of FFT results must be performed in the domain of complex numbers taking into consideration amplitude and phase of the signals.

Therefore, a transceiver implementing the scheme of the invention, as explained in the foregoing description, can tolerate any propagation delay between transmitter and receiver and a significant frequency and/or timing offset between their clocking systems. A frequency shift of +/−10% of the bandwidth can easily be accommodated. In the example used to illustrate the invention of a Bluetooth transceiver, the available bandwidth is 1 MHz and the carrier frequency is within the ISM range of 2.4 GHz. Hence, 10% of the bandwidth represents 100 kHz, i.e., +/−40 ppm for the carrier frequency. Low cost oscillators supporting this specification are readily available. With the above frequency shift, a penalty of no more than 1 dB is estimated on the loss of sensitivity of the receiver. If clock frequency shift were larger the loss would increase until the two system clocks would be shifted of the value of the entire bandwidth (1 MHz) in which case no communication would be possible since receiver would not catch anything of the transmitted signal.

Also, the acquisition time of a listening receiver after a transmitter has started to broadcast a signal is very quick on the contrary of what can be achieved with the traditional DSSS technique. The scheme of the invention relies on the speed at which FFT can be computed. FFT computation is a subject that has received a considerable attention in the academic, research and industry area. Countless publications on the subject and implementation reports have been published. It is well established that computational complexity of an FFT system increases as: $O(N \times (\log(N)+1))$, where N is the spreading factor in this case, while it is also established that DSSS increases as $O(N^3)$. This huge difference explains the tremendous improvement of the acquisition time brought by the invention.

Hence, a modulator and a demodulator according to the invention can replace the corresponding components of an existing low-cost transceiver system, e.g., a Bluetooth transceiver, to significantly enhance communications distances at the expense of a corresponding reduction of the data rate. The RF components can thus remain the same avoiding a costly and long qualification required of any new RF communications product.

The invention opens the door to a countless number of new applications in the field of telemetry, remote monitoring and surveillance, for existing products like those based on Bluetooth standard.

What is claimed is:

1. A communications system including a modulator for generating a chirp signal aimed at spreading the frequency spectrum of an information signal over a specified spectral bandwidth of a communications channel, the chirp signal having an initial instantaneous frequency and a different final instantaneous frequency, the modulator being characterized in that it comprises:

means for controlling the chirp signal from an in-phase control signal and a quadrature-phase control signal that define together, in a complex plane, over a whole duration of the chirp signal, a constant amplitude and an instantaneous phase for the chirp signal;

and further characterized in that the modulator is arranged so that:

an instantaneous frequency is derived from the speed at which the instantaneous phase is changed in the complex plane by the in-phase control signal and the quadrature-phase control signal;

the instantaneous frequency is linearly changed between the initial instantaneous frequency and the final instantaneous frequency;

initial and final instantaneous phases of the chirp signal are identical.

2. The communications system according to claim 1 arranged so that a raw chirp symbol is defined by specifying a curve of instantaneous phase values over the whole duration of the chirp signal.

3. The communications system according to claim 2 arranged so that the information signal is embedded into the chirp signal by further specifying a plurality of curves of instantaneous phase values each defining a differently modulated chirp symbol.

4. The communications system according to claim 1 arranged so that an up chirp symbol and a down chirp symbol are defined by specifying that the final instantaneous frequency is, respectively, higher or lower than the initial instantaneous frequency.

5. The communications system according to claim 1 arranged so that a minimum of two different chirp symbols are defined.

6. The communications system according to claim 1 arranged so that a frame of transmitted chirps includes a preamble of one or more raw chirp symbols.

7. The communications system according to claim 1 arranged so that chirp symbols are separated by a dead time during which transmitter is kept silent.

8. A communications system including a demodulator for receiving a chirp signal having an initial instantaneous frequency and a different final instantaneous frequency, the demodulator being characterized in that it comprises:
- means for discretely sampling the received chirp signal in the time domain in order to obtain a number of samples corresponding to a spreading factor that has been used to generate the chirp signal, further including means for evenly distributing samples over an whole chirp signal duration and means for processing the received chirp signal in a complex plane from an associated in-phase component and a quadrature phase component;
- means for locally generating a conjugate chirp signal and for interchanging values of the initial instantaneous frequency and of the final instantaneous frequency while keeping initial and final instantaneous phases of said conjugate chirp identical;
- means for multiplying the received chirp signal by the locally generated conjugate chirp signal to obtain a product signal;
- means for performing a discrete Fourier transform of the product signal to transpose it into the frequency domain;
- means for selecting a single output bin of the discrete Fourier transform wherein a peak of energy is found;
- means for analyzing contents of the single selected output bin to determine which chirp symbol has been received, further decoding and delivering whichever information signal one or more bits have been received.

9. The communications system according to claim 8 arranged so that the position of the single selected output bin is indicative of which frequency and/or timing offset exists between the clocking systems of the transmitting and of the receiving communications systems.

10. The communications system according to claim 9 arranged so that the position of the single selected output bin is used to adjust the receiving clocking system on the transmitting clocking system.

11. The communications system according to claim 8 wherein the demodulator is arranged for analyzing the received chirp signal over a sliding window encompassing a plurality of raw chirp symbols, and wherein the window is slid of an entire chirp symbol duration at each analyzing step.

12. The communications system according to claim 11 arranged so that two or more raw chirp symbols of the preamble are added to improve the level of detection of the demodulator.

13. The communications system according to claim 1 adapted to drive the radio part of an existing communications system in order to increase communications distances allowed by the system.

14. The communications system according to claim 13 wherein the existing communications system is a Bluetooth device.

15. A communications system comprising a modulator according to claim 1 and a demodulator for receiving a chirp signal having an initial instantaneous frequency and a different final instantaneous frequency, the demodulator being characterized in that it comprises:
- means for discretely sampling the received chirp signal in the time domain in order to obtain a number of samples corresponding to a spreading factor that has been used to generate the chirp signal, further including means for evenly distributing samples over an whole chirp signal duration and means for processing the received chirp signal in a complex plane from an associated in-phase component and a quadrature phase component;
- means for locally generating a conjugate chirp signal and for interchanging values of the initial instantaneous frequency and of the final instantaneous frequency while keeping initial and final instantaneous phases of said conjugate chirp identical;
- means for multiplying the received chirp signal by the locally generated conjugate chirp signal to obtain a product signal;
- means for performing a discrete Fourier transform of the product signal to transpose it into the frequency domain;
- means for selecting a single output bin of the discrete Fourier transform wherein a peak of energy is found;
- means for analyzing contents of the single selected output bin to determine which chirp symbol has been received, further decoding and delivering whichever information signal one or more bits have been received.

16. The communications system according to claim 2 arranged so that a minimum of two different chirp symbols are defined.

17. The communications system according to claim 3 arranged so that a minimum of two different chirp symbols are defined.

18. The communications system according to claim 4 arranged so that a minimum of two different chirp symbols are defined.

19. The communications system according to claim 2 arranged so that a frame of transmitted chirps includes a preamble of one or more raw chirp symbols.

20. The communications system according to claim 3 arranged so that a frame of transmitted chirps includes a preamble of one or more raw chirp symbols.

* * * * *